Figure 2:
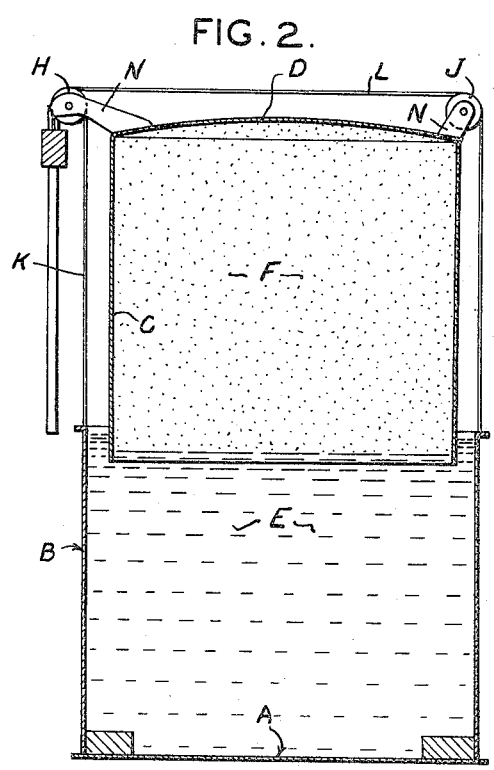

Feb. 6, 1951

J. W. ALLEN 2,540,312

BALANCING OR LEVELING MECHANISM
FOR FLUID STORAGE APPARATUS
Filed May 10, 1949

INVENTOR;
JOHN W. ALLEN
BY Nells L. Church.
ATTORNEY

Patented Feb. 6, 1951

2,540,312

UNITED STATES PATENT OFFICE 2,540,312

BALANCING OR LEVELING MECHANISM FOR FLUID STORAGE APPARATUS

John W. Allen, Chicago, Ill., assignor to John H. Wiggins, Chicago, Ill.

Application May 10, 1949, Serial No. 92,276

3 Claims. (Cl. 48—176)

This invention relates to mechanisms of the kind that are used in fluid storage apparatus for maintaining a lifter roof, bell or equivalent vertically-movable member in a substantially level position during the rise and fall of said roof, bell, or equivalent member, and particularly balancing or leveling mechanisms of the type that employ one or more weights attached by cables or equivalent flexible elements to the said vertically-movable member in such a way as to stabilize said member and counteract the tendency of said member to tilt or shift out of the approximately level or horizontal position in which said member should be maintained for efficient operation.

One object of my invention is to provide a balancing or leveling mechanism of the general type referred to, which is of such design or construction that it is unnecessary to use a stationary frame and co-acting rollers, to guide or assist in maintaining the desired position of the lifter roof or equivalent vertically-movable member of the apparatus.

Another object is to provide a balancing or leveling mechanism of the general type referred to, whose co-acting parts are located on the exterior of the apparatus where they are easily accessible, and moreover, are so disposed that they will not be injuriously affected by gas or liquid stored in the apparatus.

Another object is to provide a balancing or leveling mechanism of the kind mentioned, whose co-acting parts are so arranged that they add weight to the lifter roof or equivalent part of the apparatus, thereby increasing the operating pressure of the apparatus.

And still another object of my invention is to provide a balancing or leveling mechanism that is inexpensive to build and install, due to the fact that close tolerances are not necessary in manufacturing and assembling the co-acting parts of the mechanism. Other desirable features of my improved mechanism will be hereinafter pointed out.

I have herein illustrated my invention embodied in or applied to a gas holder of the type that comprises a tank which constitutes the lower portion of the apparatus, a vertically-movable roof, bell or equivalent member provided with a depending skirt or side wall portion arranged in telescoped relation with the tank side wall, and a body of liquid that constitutes a "wet seal" for the space or joint between the tank side wall and the skirt or side wall portion on the roof. However, I wish it to be understood that my invention is equally applicable to fluid storage apparatus of the kind that employ a gas-tight, flexible element, commonly referred to as a "dry seal," for maintaining a gas-tight joint between the tank of the apparatus and the vertically-movable member that constitutes the top wall of the storage chamber of the apparatus.

Figure 1:
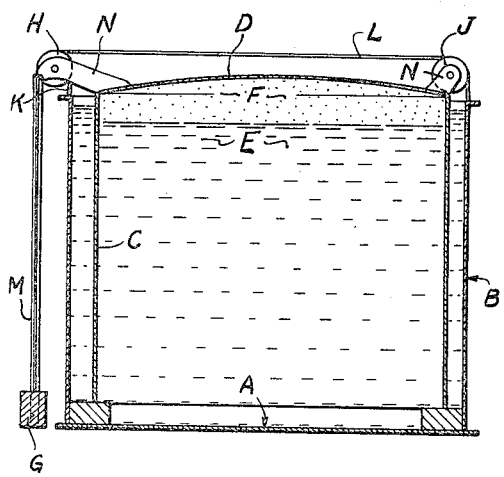

Figure 1 of the drawings is a vertical, transverse sectional view of a wet seal gas holder equipped with a balancing or leveling mechanism constructed in accordance with my invention, showing the lifter roof in its lowermost position.

Figure 3:
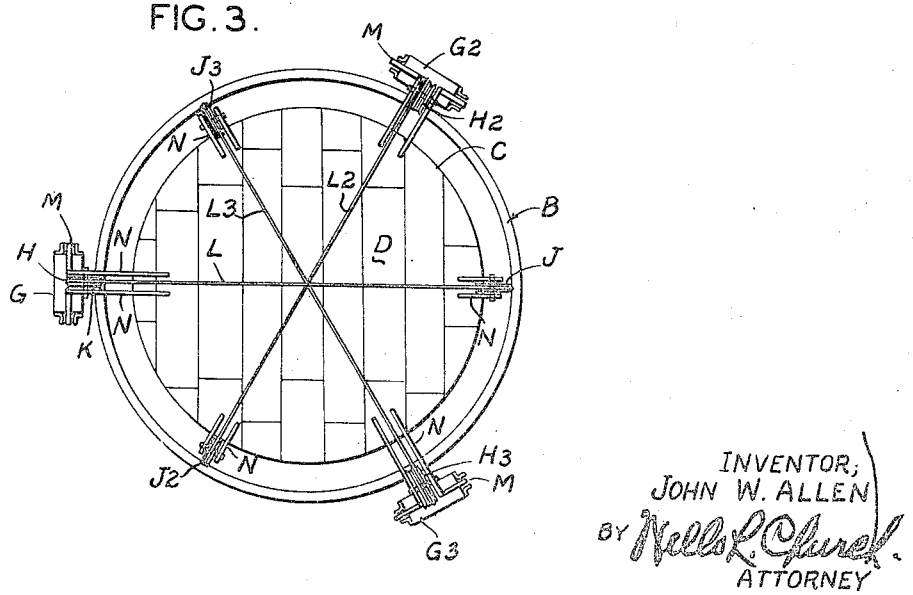

Figure 2 is a similar view, showing the lifter roof in its highest position; and Figure 3 is a top plan view of the apparatus.

In the drawings the reference characters A and B designate the bottom and side wall, respectively, of a tank that contains a body of sealing liquid E. The storage chamber of the apparatus is formed by a vertically-movable, bell-shaped or inverted cup-shaped member mounted in said tank and provided with a top or roof D equipped with a depending skirt or side wall portion C, the bottom edge of which is at all times immersed in the sealing liquid E in the tank.

The improved mechanism I have devised for maintaining the above mentioned vertically-movable member in a substantially level position and restoring the equilibrium of said member when it tilts out of its normal level position, comprises at least one vertically-movable weight G arranged on the exterior of the tank of the apparatus, a pair of cables or equivalent flexible elements K and L leading from said weight and attached at remotely spaced points to the side walls B of said tank, and sheaves or equivalent guides H and J mounted on the roof or top portion D of the vertically-movable member of the apparatus in such a manner that the short cable K leads upwardly from the weight G, thence over the sheave H, and thence downwardly to a point of attachment on the side wall B of the tank, and the long cable L leads upwardly from the weight, thence over the sheave H, thence horizontally over the roof D, and thence over the sheave J, and downwardly from same to a point of attachment on the side wall B of the tank. The sheaves H and J are carried by laterally-projecting brackets N on the roof D, and the sheave H is provided with two grooves, one for the cable K, and the other for the cable L. As shown in Figure 3, I prefer to provide my improved leveling mechanism with three vertically-movable weights, of the kind above referred to, each of which is connected by a long cable and a short cable that lead from said weights over sheaves on the roof D, and are then attached to the tank side wall B at opposite ends of a diameter. In Figure 3 the reference characters $G^2$ and $G^3$ designate the two additional weights. The long cable $L^2$ that leads from the weight $G^2$ across the roof is supported by a double sheave $H^2$ and a single sheave $J^2$ carried by the roof, and the long cable $L^3$ that leads from the weight $G^3$ across the roof is supported by a double sheave $H^3$ and a single sheave $J^3$ carried by the roof. In Figure 3 the short cables that lead from the weights $G^2$ and $G^3$ are not shown. Instead of using three weights, each of which is attached by two cables to the tank side wall, as above described, the same effect can be obtained by two vertically-movable weights located on the exterior of the tank at opposite ends of a diameter and each weight suspended from three cables supported by sheaves on the roof D and attached to the tank side wall B at about equal spaces circumferentially.

The operation of my improved leveling mechanism is as follows: If the roof D were perfectly balanced, cable K would function merely as an unstressed cable with no load on it, and the entire load of weight G would be carried by cable L to the far side of the roof, remote from the weight G. This gives a balanced condition of a pull-down on each side of the roof equal to the load of weight G. The net result is a pull-down on roof D equal to twice the load of weight G.

In the event the roof is subjected to a force tending to tilt it upwardly at sheave H, the cable L would become slack and the entire load of the weight G would be applied to the cable K, with the result that there would be a total pull-down on sheave H equal to twice the load of weight G, thereby counterbalancing the tipping or tilting force exerted on the roof.

If the force exerted on the roof were reversed, the roof would tend to tip downwardly at sheave H, in which case cable L would take the entire load of weight G. This would give no balancing effect to overcome the tipping of the roof, since there would be a load equal to weight G on both sides of the roof. However, in such a situation if the portion of the roof in proximity to the sheave H moves downwardly, the portions of the roof in proximity to the sheaves $H^2$ and $H^3$ would move upwardly and weights $G^2$ and $G^3$ would be held by the short cables corresponding to the cable K, that are attached to the roof in proximity to the weights $G^2$ and $G^3$, thereby creating a balancing force sufficient to keep the roof steady. As shown in Figures 1 and 2, the weight G moves upwardly a distance equal to twice the travel of the lift on a single lift holder. Preferably, and as shown in Figure 2, the supporting bracket N on the roof which carries the sheave H, is provided with a rigid, depending, vertically-disposed guide M for the weight G, that prevents said weight from rotating or swinging.

A mechanism of the construction above described attains the objects of my invention previously specified, and is a decided improvement on the balancing or leveling mechanisms now used on fluid storage apparatus of the type that comprise a lifter roof, bell or equivalent vertically-movable member that rises and falls in response to variations in the internal pressure of the storage chamber of the apparatus.

Having thus described my invention, what I claim as new and desire to secure by Letters Patent is:

1. A leveling or balancing mechanism for fluid storage apparatus of the type that include a tank and a roof or equivalent member that moves vertically relatively to said tank, comprising a vertically-movable weight arranged on the exterior of the tank side wall, a flexible element leading upwardly from said weight over a guide on the vertically-movable roof and thence downwardly to a point of attachment on the tank side wall in proximity to said weight, and a second flexible element leading upwardly from the weight over the above-mentioned guide, thence horizontally over the roof to a second guide on the roof and thence downwardly from said second guide to a point of attachment on the tank side wall that is in remote relationship to said weight.

2. A leveling or balancing mechanism for fluid storage apparatus of the type that include a tank and a roof or equivalent member that moves vertically relatively to said tank, comprising a series of vertically-movable weights arranged in spaced relation around the tank side wall on the exterior of same, and at least two cables leading upwardly from each of said weights over guides on said roof and extending downwardly from said guides to points of attachment on the tank side wall, one of said cables being attached to the tank in proximity to said weight and the other cable extending horizontally over the roof and being attached to the tank at a point remote from the weight.

3. A leveling or balancing mechanism for fluid storage apparatus of the type that include a tank and a roof or equivalent member that moves vertically relatively to said tank, comprising a series of vertically-movable weights arranged in spaced relation around the tank side wall on the exterior of same, a long cable and a short cable attached to each of said weights and leading upwardly from same, a double grooved guide on the roof over which both of said cables pass, the short cable extending downwardly from said guide to a point of attachment on the tank wall and the long cable extending horizontally from said guide across the roof, and a single grooved guide on the roof over which said long cable passes and thence extends downwardly to a point of attachment on the tank side wall.

JOHN W. ALLEN.

REFERENCES CITED

The following references are of record in the file of this patent:

UNITED STATES PATENTS

| Number | Name | Date |
| --- | --- | --- |
| 273,521 | Hanlon | Mar. 6, 1883 |
| 2,436,348 | Allen | Feb. 17, 1948 |
| 2,457,762 | Wiggins | Dec. 28, 1948 |